(12) United States Patent
Holder (10) Patent No.: US 8,905,426 B2
(45) Date of Patent: Dec. 9, 2014

(54) UNIVERSAL PULL CART ATTACHMENT DEVICE AND METHOD TO ENHANCE GOLF PLAY

(71) Applicant: Joe Holder, Lake Tapps, WA (US)

(72) Inventor: Joe Holder, Lake Tapps, WA (US)

(*) Notice: Subject to any disclaimer, the term of this patent is extended or adjusted under 35 U.S.C. 154(b) by 0 days.

(21) Appl. No.: 13/973,891

(22) Filed: Aug. 22, 2013

(65) Prior Publication Data

US 2014/0062063 A1 Mar. 6, 2014

Related U.S. Application Data

(63) Continuation of application No. 12/430,781, filed on Apr. 27, 2009, now Pat. No. 8,544,868.

(60) Provisional application No. 61/125,799, filed on Apr. 28, 2008.

(51) Int. Cl.
*A63B 55/04* (2006.01)
*B60D 1/24* (2006.01)
*B60D 1/48* (2006.01)
*B60D 1/00* (2006.01)
*B62B 5/00* (2006.01)
*A63B 55/08* (2006.01)

(52) U.S. Cl.
CPC ............... *B60D 1/24* (2013.01); *B62B 5/0079* (2013.01); *A63B 2055/083* (2013.01); *B62B 2202/404* (2013.01); *B60D 1/48* (2013.01); *B60D 1/00* (2013.01)
USPC .......................................... 280/495; 473/169

(58) Field of Classification Search
CPC ..................... A63B 2055/083; A63B 69/3691; B60D 1/485; B60D 1/52
USPC ........................................... 280/495; 473/169
See application file for complete search history.

(56) References Cited

U.S. PATENT DOCUMENTS

| | | | |
|---|---|---|---|
| 3,237,968 A | 3/1966 | Arsenault | 280/492 |
| 3,877,723 A * | 4/1975 | Fahey et al. | 280/204 |
| 4,337,882 A | 7/1982 | Hampton | 224/42.03 R |
| 4,759,559 A | 7/1988 | Moulton | 280/40 |
| 5,098,113 A * | 3/1992 | Albitre | 280/204 |
| 5,328,193 A | 7/1994 | Shiew | 280/87.041 |
| 5,482,304 A | 1/1996 | Smith | 280/204 |
| 5,711,543 A | 1/1998 | Stokes | 280/504 |
| 5,738,261 A | 4/1998 | Dula | 224/533 |
| 6,168,058 B1 | 1/2001 | Janek | 224/527 |
| 6,193,256 B1 | 2/2001 | Banary, Jr. | 280/400 |
| 6,409,188 B1 | 6/2002 | Hesmer | 280/79.5 |
| 6,662,679 B2 | 12/2003 | Hobdy et al. | 74/548 |
| 6,705,624 B2 | 3/2004 | Cassoni | 280/47.131 |
| 6,715,774 B2 | 4/2004 | Cassoni | 280/47.131 |
| 6,739,604 B2 | 5/2004 | Cassoni | 280/47.131 |
| 6,857,650 B2 | 2/2005 | Ward | 280/491.3 |
| 6,921,099 B2 | 7/2005 | Hoffmann | 280/292 |
| 7,143,914 B2 | 12/2006 | McManus | 224/519 |

(Continued)

*Primary Examiner* — Kevin Hurley
*Assistant Examiner* — Michael Stabley
(74) *Attorney, Agent, or Firm* — Seed IP Law Group PLLC (57) ABSTRACT

This disclosure generally relates to a universal pull cart attachment device and method to enhance golf play. In some cases, a universal pull cart attachment device having a displaceable member is coupled to a motorized golf cart to allow users to displace the member to interchangeably receive a handle of a conventional golf bag pull cart. A method of playing golf using such a universal pull cart attachment device is also provided.

10 Claims, 9 Drawing Sheets

(56) References Cited

U.S. PATENT DOCUMENTS

| | | | |
|---|---|---|---|
| 7,210,697 B2 | 5/2007 | Simpson | 280/415.1 |
| 7,604,245 B2 | 10/2009 | Cassoni | 280/47.131 |
| 2001/0048011 A1 | 12/2001 | Burns | 224/527 |
| 2002/0105164 A1 | 8/2002 | Hobdy et al. | 280/504 |
| 2003/0080534 A1 | 5/2003 | Freeman | 280/495 |
| 2004/0026279 A1 | 2/2004 | Miller | 206/315.2 |
| 2004/0033841 A1 | 2/2004 | Graham | 473/169 |
| 2004/0164517 A1 | 8/2004 | Lewy et al. | 280/493 |
| 2004/0173993 A1 | 9/2004 | Cassoni | 280/460.1 |
| 2004/0188984 A1 | 9/2004 | Cassoni | 280/652 |
| 2005/0274761 A1 | 12/2005 | Hesmer | 224/519 |
| 2006/0172810 A1 | 8/2006 | Parra | 473/167 |

\* cited by examiner

Greenfee Revenue Chart # of foursomes

| Days | 5 | 6 | 7 | 8 | 9 | 10 |
|---|---|---|---|---|---|---|
| 50 | 250 | 300 | 350 | 400 | 450 | 500 |
| 55 | 275 | 330 | 385 | 440 | 495 | 550 |
| 60 | 300 | 360 | 420 | 480 | 540 | 600 |
| 65 | 325 | 390 | 455 | 520 | 585 | 650 |
| 70 | 350 | 420 | 490 | 560 | 630 | 700 |
| 75 | 375 | 450 | 525 | 600 | 675 | 750 |
| 80 | 400 | 480 | 560 | 640 | 720 | 800 |
| 85 | 425 | 510 | 595 | 680 | 765 | 850 |
| 90 | 450 | 540 | 630 | 720 | 810 | 900 |
| 95 | 475 | 570 | 665 | 760 | 855 | 950 |
| 100 | 500 | 600 | 700 | 800 | 900 | 1000 |
| 105 | 525 | 630 | 735 | 840 | 945 | 1050 |
| 110 | 550 | 660 | 770 | 880 | 990 | 1100 |
| 115 | 575 | 690 | 805 | 920 | 1035 | 1150 |
| 120 | 600 | 720 | 840 | 960 | 1080 | 1200 |

Represents additional foursomes over the given amount of days.

*FIG.9*

Greenfee Revenue Chart # of foursomes

| Days | 5 | 6 | 7 | 8 | 9 | 10 |
|---|---|---|---|---|---|---|
| 50 | 40,000.00 | 48,000.00 | 56,000.00 | 64,000.00 | 72,000.00 | 80,000.00 |
| 55 | 44,000.00 | 52,800.00 | 61,600.00 | 70,400.00 | 79,200.00 | 88,000.00 |
| 60 | 48,000.00 | 57,600.00 | 67,200.00 | 76,800.00 | 86,400.00 | 96,000.00 |
| 65 | 52,000.00 | 62,400.00 | 72,800.00 | 83,200.00 | 93,600.00 | 104,000.00 |
| 70 | 56,000.00 | 67,200.00 | 78,400.00 | 89,600.00 | 100,800.00 | 112,000.00 |
| 75 | 60,000.00 | 72,000.00 | 84,000.00 | 96,000.00 | 108,000.00 | 120,000.00 |
| 80 | 64,000.00 | 76,800.00 | 89,600.00 | 102,400.00 | 115,200.00 | 128,000.00 |
| 85 | 68,000.00 | 81,600.00 | 95,200.00 | 108,800.00 | 122,400.00 | 136,000.00 |
| 90 | 72,000.00 | 86,400.00 | 100,800.00 | 115,200.00 | 129,600.00 | 144,000.00 |
| 95 | 76,000.00 | 91,200.00 | 106,400.00 | 121,600.00 | 136,800.00 | 152,000.00 |
| 100 | 80,000.00 | 96,000.00 | 112,000.00 | 128,000.00 | 144,000.00 | 160,000.00 |
| 105 | 84,000.00 | 100,800.00 | 117,600.00 | 134,400.00 | 151,200.00 | 168,000.00 |
| 110 | 88,000.00 | 105,600.00 | 123,200.00 | 140,800.00 | 158,400.00 | 176,000.00 |
| 115 | 92,000.00 | 110,400.00 | 128,800.00 | 147,200.00 | 165,600.00 | 184,000.00 |
| 120 | 96,000.00 | 115,200.00 | 134,400.00 | 153,600.00 | 172,800.00 | 192,000.00 |

Represents additional revenue for the additional foursomes, using $40 for greenfees.

UNIVERSAL PULL CART ATTACHMENT DEVICE AND METHOD TO ENHANCE GOLF PLAY

BACKGROUND

1. Technical Field

The present disclosure relates generally to the game of golf, and particularly to a universal pull cart attachment device and method to enhance golf play.

2. Description of the Related Art

There are several traditional methods of traversing a golf course during play. These traditional methods include: (1) walking the entire course while carrying one's clubs, (2) walking the entire course pulling a pull cart with one's clubs attached, and (3) riding in a motorized cart with one's clubs retained in the motorized cart. Each of these methods suffers from constraints which lead to slow golf play, thus resulting in reduced player enjoyment and reduced revenue for golf course associations and owners. For example, when walking a course, golfers inherently travel at slower speeds and can suffer from fatigue over the length of the course resulting in slower play and reduced enjoyment.

The use of a cart does not necessarily speed play when compared to walking. When using a motorized cart, golfers generally strap their clubs to the cart and thus become bound to the cart when making club selections. Following a shot, a golfer's ball is often located on areas of the course where carts are not permitted or unable to travel. Golfers must leave their cart behind and travel to their ball by foot, thus slowing game play. This problem is compounded when a golfer makes the wrong club selection and must return to the cart. Furthermore, because each golfer's clubs are retained in the cart, each golfer is generally bound to the particular cart in which his clubs are located and thus, when playing in a foursome (which is typical), each golfer is unable to conveniently switch carts to travel with another golfer whose ball may be in an area proximate to his own ball.

Some devices have been developed in attempt to facilitate or speed the play of golf; however, such devices suffer from a number of deficiencies.

U.S. Pat. No. 3,237,968 discloses a connector that is particularly adapted for use in trailing pull carts behind a self-powered vehicle. The device is intended to facilitate play of a foursome where two golfers travel via the self-powered vehicle and two golfers travel via foot. The connector does not allow for quick disconnect of the pull carts and thus does not overcome limitations resulting from methods of play in which golfers are essentially bound to a particular motorized cart.

U.S. Pat. No. 6,705,624 discloses a motorized golf cart with automated lifting of detachable devices such as pull carts. The automated lifting device requires actuation of a linear actuator to lift pull carts from the ground to an elevated position. The time required to actuate the device takes away from game play and results in slower play. In addition, the lifting device requires custom pull carts and thus fails to provide a universal attaching system for a wide variety of pull carts.

A universal pull cart attachment device is needed for attaching a wide variety of pull carts having varied handle designs and wheel sizes to motorized golf carts to provide a versatile system of playing golf in which a golfer may quickly detach a pull cart from a motorized golf cart to reach a subsequent shot location and may quickly reattach the pull cart to the same or another golf cart for traversing to yet another shot location.

BRIEF DESCRIPTION OF THE SEVERAL VIEWS OF THE DRAWINGS

FIGS. 9 and 10 provide representative data of potential revenue gains associated with the system of playing golf illustrated in FIGS. 5-8.

DETAILED DESCRIPTION

Figure 1:
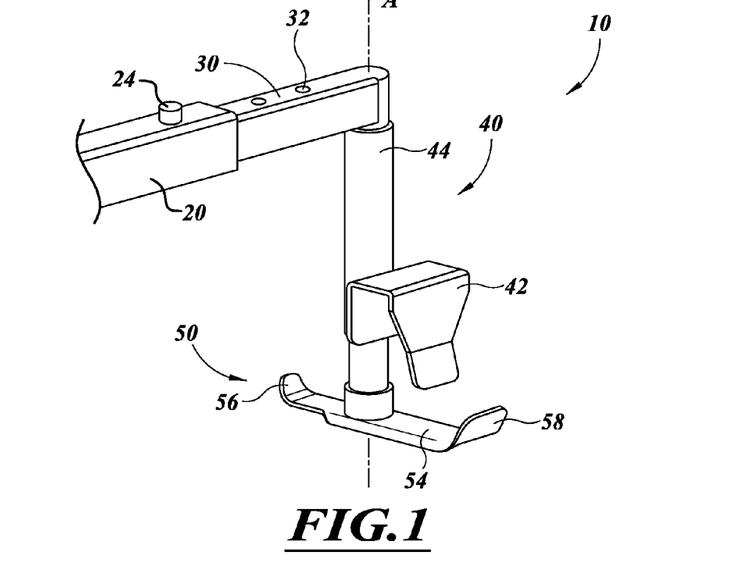
FIG. 1 is a perspective view of a universal pull cart attachment, according to one embodiment.
Figure 2:
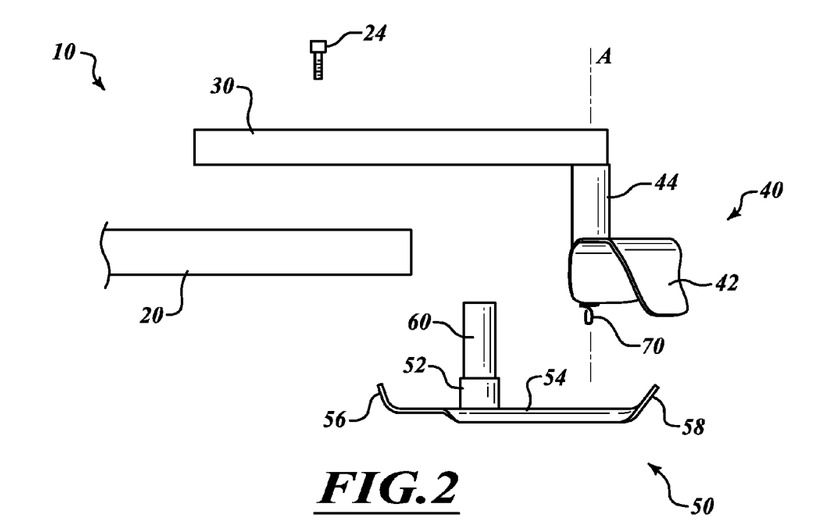
FIG. 2 shows the universal pull cart attachment of FIG. 1 partially disassembled.
Figure 3:
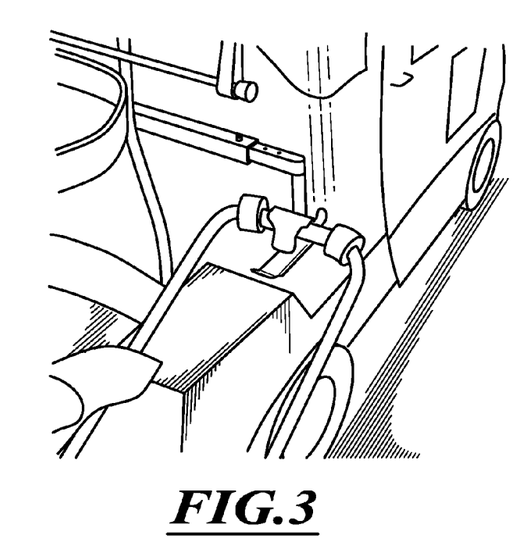
FIGS. 3 and 4 show the universal pull cart attachment of FIG. 1 mounted to a motorized golf cart with a pull cart engaged therein.
Figure 4:
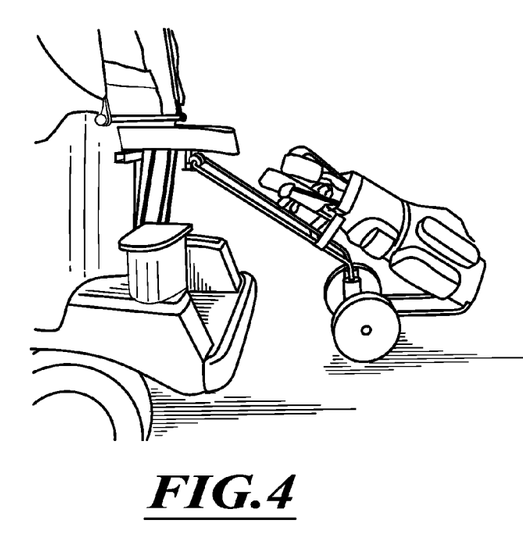

FIGS. 1-16 depict a universal pull cart attachment device suitable for attaching a conventional pull cart to a motorized golf cart, according to one embodiment. As shown in FIG. 1, the attachment device 10 includes a base member 20 and an extension member 30. The base member 20 of the illustrated embodiment is configured to mount to a motorized golf cart via a plurality of mounting holes and corresponding hardware. The base member 20 can be pre-installed on a motorized cart or attached as an add-on feature. In an alternate embodiment, the universal pull cart attachment 10 is formed integrally with the motorized golf cart. For example, the base member 20 of the pull cart attachment may be molded into a golf cart frame.

The extension member 30 is coupled to the base member 20 such that the extension member 30 can be selectively extended to facilitate design variations in motorized golf carts. The extension member 30 can extend from a right side of the motorized cart or from a left side, or both. The extension member 30 allows selective placement of the device such that a golfer may access one or both sides of a pull cart when attached thereto. In a preferred embodiment, two extension members 30 are provided for attachment of two pull carts. In the illustrated embodiment, the base member 20 is steel square tubing and the extension member 30 is steel u channel, although numerous structural shapes (e.g., round stock) and materials are contemplated (e.g., stainless steel, composite materials). The base member 20 includes an aperture proximate at least one end thereof to receive a fastener 24 for coupling to one of a series of spaced apertures 32 in the extension member 30. In an alternate embodiment, the base member 20 and extension member 30 are integral.

The extension member 30 includes a cylindrical mounting stem (not shown) that defines a first axis of rotation A. The mounting stem is sized for insertion into a first retention member 40. The first retention member 40 includes a hook 42 and a cylindrical sleeve 44 for mating with the mounting stem of the extension member 30 to allow rotational movement about the first axis of rotation A. The rotational movement of the first retention member 40 may be limited by stops. In the illustrated embodiment, an internal dowel (not shown) engages slots in the mounting stem of the extension member 30 to limit rotational travel. Other features for limiting rotational movement are well known in the art.

The hook 42 is sized and shaped to retain a handle of varying sizes as commonly found on conventional pull carts. In an alternate embodiment, the hook 42 is selectively adjustable to provide selective engagement with the handle of a pull cart. In one embodiment, a cushioning material may be placed on an under surface of the hook 42 to provide protection against chafing, absorption of vibration, and/or adaptation to various handle configurations.

A second retention member 50 having a cylindrical stem 52 and support surface 54 is coupled to the first retention member 40 via a cylindrical insert 60 and extension spring 70. The cylindrical insert 60 is press-fit or otherwise fastened to the cylindrical stem 52 of the second retention member 50 and sized to slidably engage the sleeve 44 of the first retention member 40. The insert 60 may include a groove in the face thereof to engage a surface feature of the sleeve 44 so as to prevent relative rotational movement between the sleeve 44 and the insert 60. The first and second retention members 40, 50 are able to at least partially rotate about the first axis of rotation A to enable a pull cart attached thereto to turn in combination with the motorized cart.

The second retention member 50 translates along the first axis of rotation A from an engaged position to a disengaged position and is biased towards the engaged position by the extension spring 70 that is retained in the first retention member 40 and secured to the second retention member 50. The bias force of the extension spring 70 is selected such that a user can easily displace the second retention member 50 to the disengaged position by hand. Extension features 56, 58 at opposing ends of the second retention member 50 provide levers for displacement of the second retention member 50 to the disengaged position.

In the engaged position, the hook 42 of the first retention member 40 cooperates with the support surface 54 of the second retention member 50 to retain the handle of a pull cart while simultaneously allowing the handle of the pull cart to rotate, such that the pull cart is able to pitch up and down. Edges of the support surface 54 may be contoured to reduce chafing or abrasion of the pull cart handle. When a handle of a pull cart is engaged, the wheels of the pull cart remain in contact with the ground. Because the wheels remain in contact with the ground, it is preferable to use the universal pull cart attachment device with pull carts having larger diameter wheels that are better adapted for traveling at higher speeds.

Figure 11A:
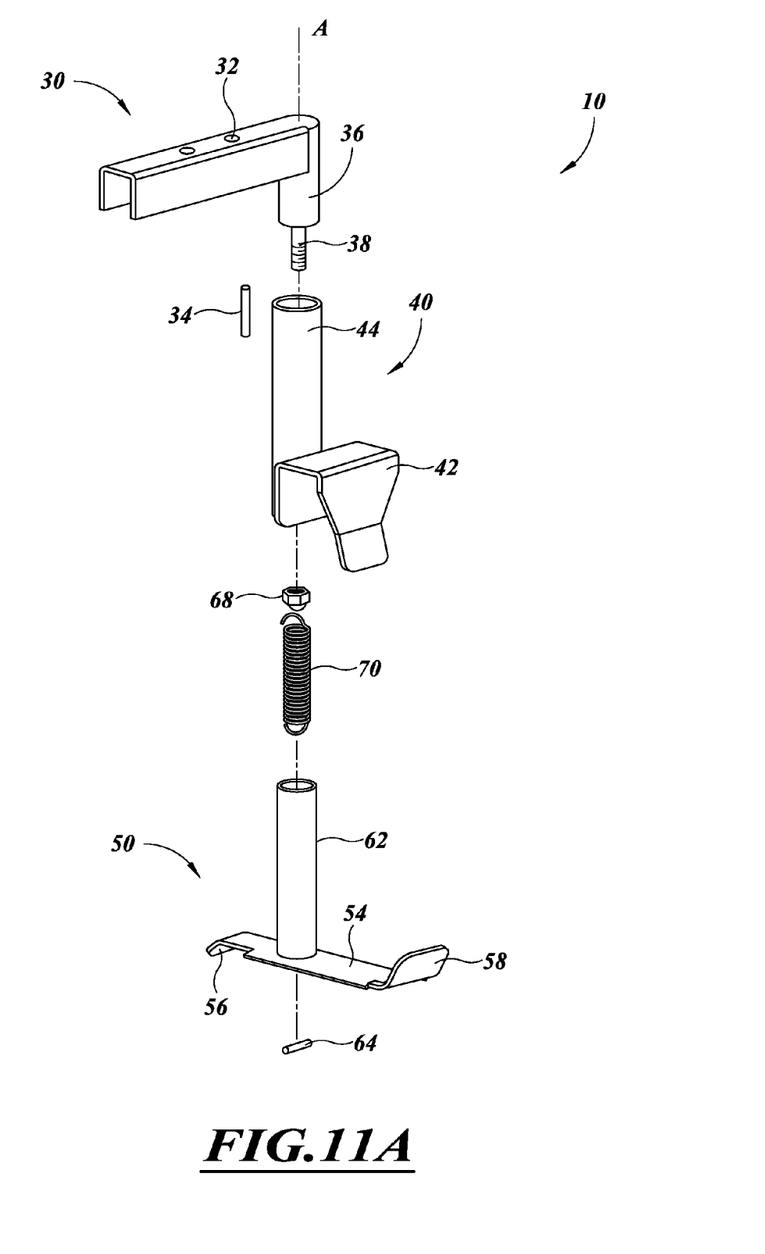
FIG. 11A is a perspective view of a universal pull cart attachment in an unassembled condition, according to one embodiment.
Figure 11B:
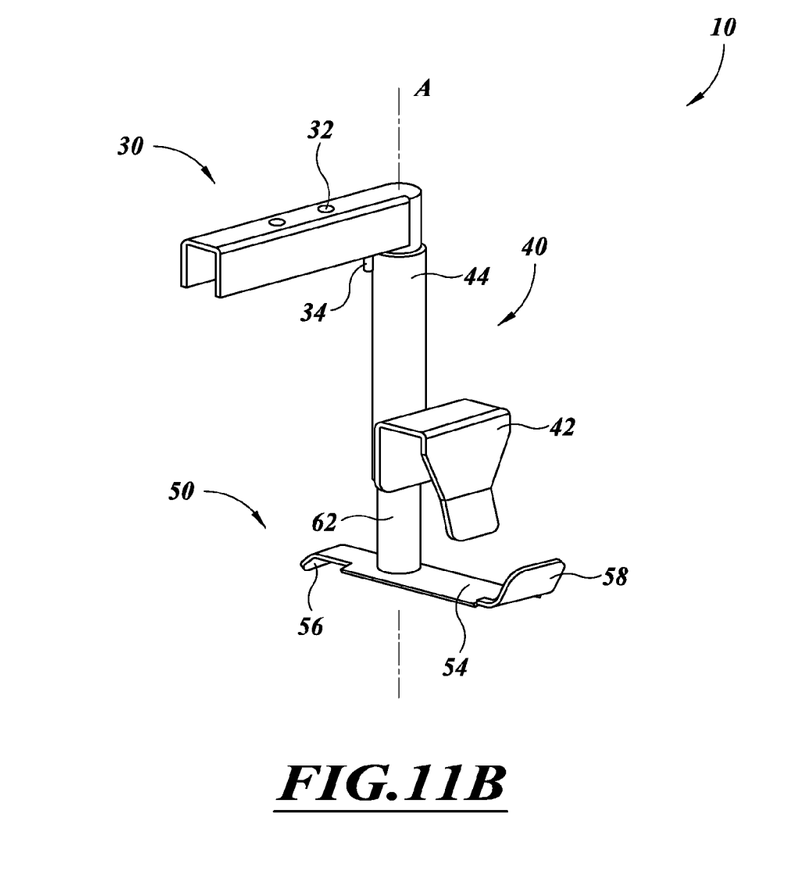
FIG. 11B is a perspective view of the universal pull cart attachment of FIG. 11A in an assembled condition.

FIGS. 11A and 11B depict a universal pull cart attachment device suitable for attaching a conventional pull cart to a motorized golf cart, according to another embodiment. Similar to the device described above, the attachment device 10 includes an extension member 30 for attaching to a base member (not shown), which is configured to mount to a motorized golf cart via a plurality of mounting holes and corresponding hardware. The illustrated extension member 30 includes a series of spaced apertures 32 for coupling to the base member in such a manner that the extension member 30 can be selectively extended to facilitate design variations in motorized golf carts. In this manner, the extension member 30 may allow for selective placement of the attachment device 10 such that a golfer may access one or both sides of a pull cart when attached thereto.

The extension member 30 further includes a cylindrical mounting stem 36 that defines a first axis of rotation A and that is sized for insertion into a first retention member 40. The first retention member 40 includes a hook 42 and a cylindrical sleeve 44 for mating with the mounting stem 36 of the extension member 30 to allow rotational movement about the first axis of rotation A. The rotational movement of the first retention member 40 about axis A may be limited by stops. In the illustrated embodiment, a dowel 34 is coupled to the first retention member 40, for example, by welding, such that the dowel 34 comes into contact with sidewalls of the extension member 30 during operation. Other features for limiting rotational movement are well known in the art.

In accordance with the illustrated embodiment, the first retention member 40 includes a threaded insert (not shown) fixedly attached within cylindrical sleeve 44 for coupling the first retention member 40 to the extension member 30. In particular, a threaded rod 38 of extension member 30 mates with the threaded insert of the first retention member 40 to couple the components together while allowing for rotational movement therebetween. As can be appreciated from FIGS. 11A and 11B, dowel 34 is coupled to the first retention member 40 after having attached the first retention member 40 to the extension member 30.

A second retention member 50 having a cylindrical body 62 and support surface 54 is coupled to the assembly of the first retention member 40 and extension member 30 via an extension spring 70, such that the second retention member 50 may be displaced vertically from the first retention member 40 along axis A against a bias force of the spring 70. The extension spring 70 may be attached at one end to a nut 68 that is sized to engage threaded rod 38 of the extension member 30 and may be attached at the other end via a retaining rod 64 that is welded or otherwise coupled to the second retention member 50.

The cylindrical body 62 of the second retention member 50 slidably engages the cylindrical sleeve 44 of the first retention member 40 to maintain these components about a common rotation axis A. An additional alignment feature may also be included to keep the first and second retention members 40, 50 aligned with respect to each other throughout rotational movement. For example, a fastener received in a threaded hole formed on the cylindrical sleeve 44 of the first retention member 40 may engage a vertical slot (not shown) formed in cylindrical body 62 of the second retention member 50. Alternatively, a stud or other projecting feature located on the cylindrical sleeve 44 may similarly engage a vertical slot formed in the cylindrical body 62. In this manner, the first and second retention members 40, 50 are able to at least partially rotate together about the first axis of rotation A to enable a pull cart attached thereto to turn in combination with the motorized cart.

As described above, the second retention member 50 may be displaced vertically from the first retention member 40 along axis A against a bias force of the spring 70. More particularly, the second retention member 50 translates along the first axis of rotation A from an engaged position to a disengaged position, the second retention member being biased towards the engaged position by the extension spring 70. The bias force of the extension spring 70 is selected such that a user can easily displace the second retention member 50 to the disengaged position by hand. Extension features 56, 58 at opposing ends of the second retention member 50 provide levers for displacement of the second retention member 50 to the disengaged position.

In the engaged position, the hook 42 of the first retention member 40 cooperates with the support surface 54 of the second retention member 50 to retain the handle of a pull cart while simultaneously allowing the handle of the pull cart to rotate, such that the pull cart is able to pitch up and down. Edges of the support surface 54 may be contoured to reduce chafing or abrasion of the pull cart handle.

A universal pull cart attachment device, such as, for example, the embodiment shown in FIGS. 1-4 or the embodiment shown in FIGS. 11A and 11B, is used to provide a novel method for coupling a conventional pull cart to a motorized golf cart. The method includes the steps of displacing a retention member of the universal pull cart attachment device from a first engaged position to a second disengaged position, inserting a handle of a pull cart beneath a hook of the universal pull cart attachment device, and releasing the retention member such that the handle of the pull cart is retained in the attachment device while allowing wheels of the pull cart to remain in contact with a ground surface. Employing such a method allows a user to attach a wide variety of pull carts to a motorized golf cart without customizing the pull cart for attachment thereto. Nor is a user required to lift the pull cart. Wheels of the pull cart remain in contact with the ground, thus facilitating quick withdraw of the pull cart from the motorized golf cart.

FIGS. 5-8 illustrate examples of a method of playing golf using a universal pull cart attachment device that allows for quick disconnection so players are never separated from their clubs and similarly allows for quick reconnection so players can quickly traverse a golf course via a motorized cart on long fairways or between holes. For the purposes of clarity and ease of comprehension, the method of play using a universal pull cart attachment device, such as, for example, the embodiment shown in FIGS. 1-4, will be explained with reference to a foursome of golfers A, B, C, and D and their respective carts, Cart 1 and Cart 2.

Figure 5:
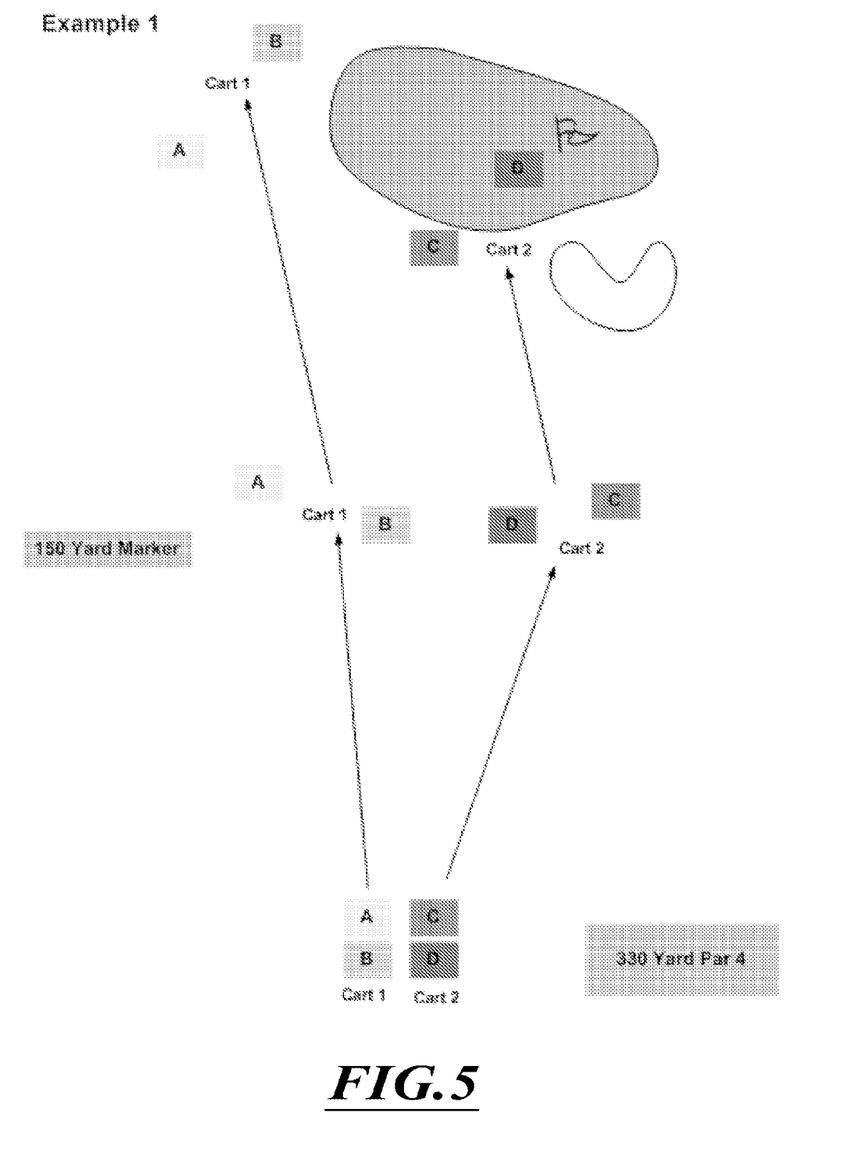
FIGS. 5-8 illustrate a system of playing golf utilizing a universal pull cart attachment device.
Figure 6:
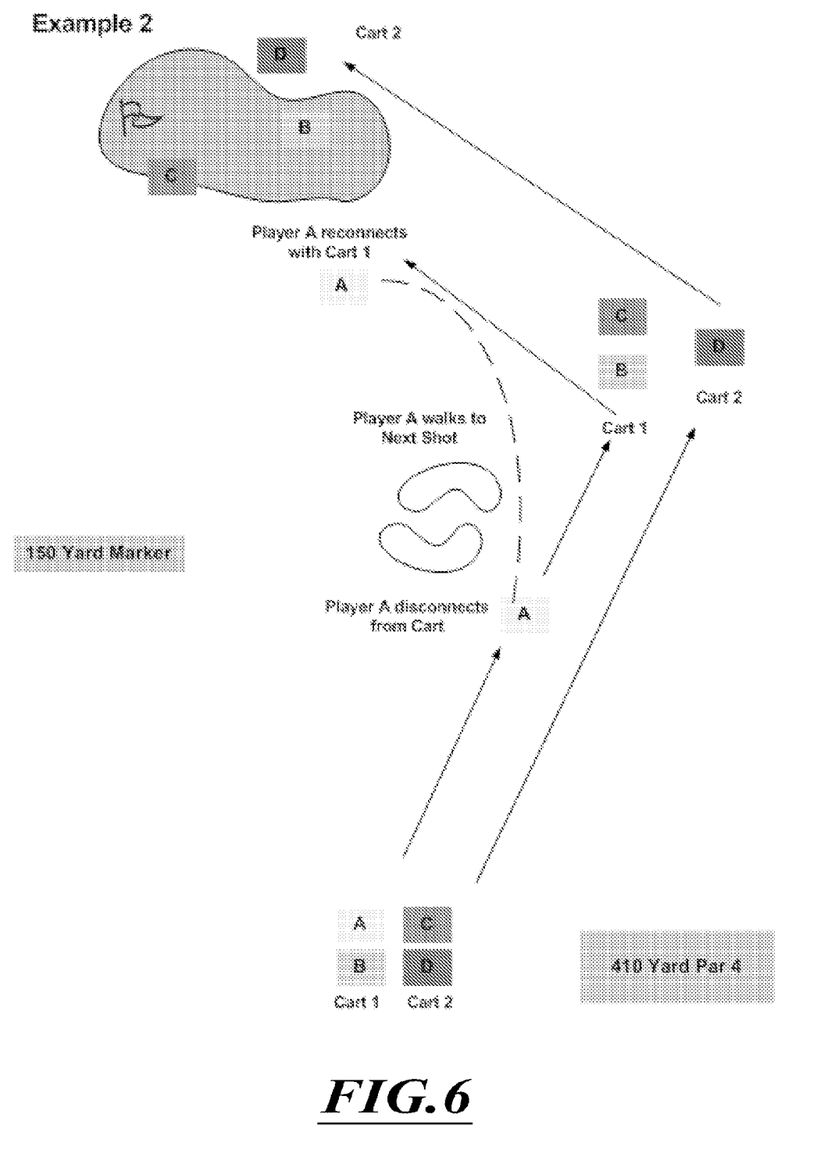
Figure 7:
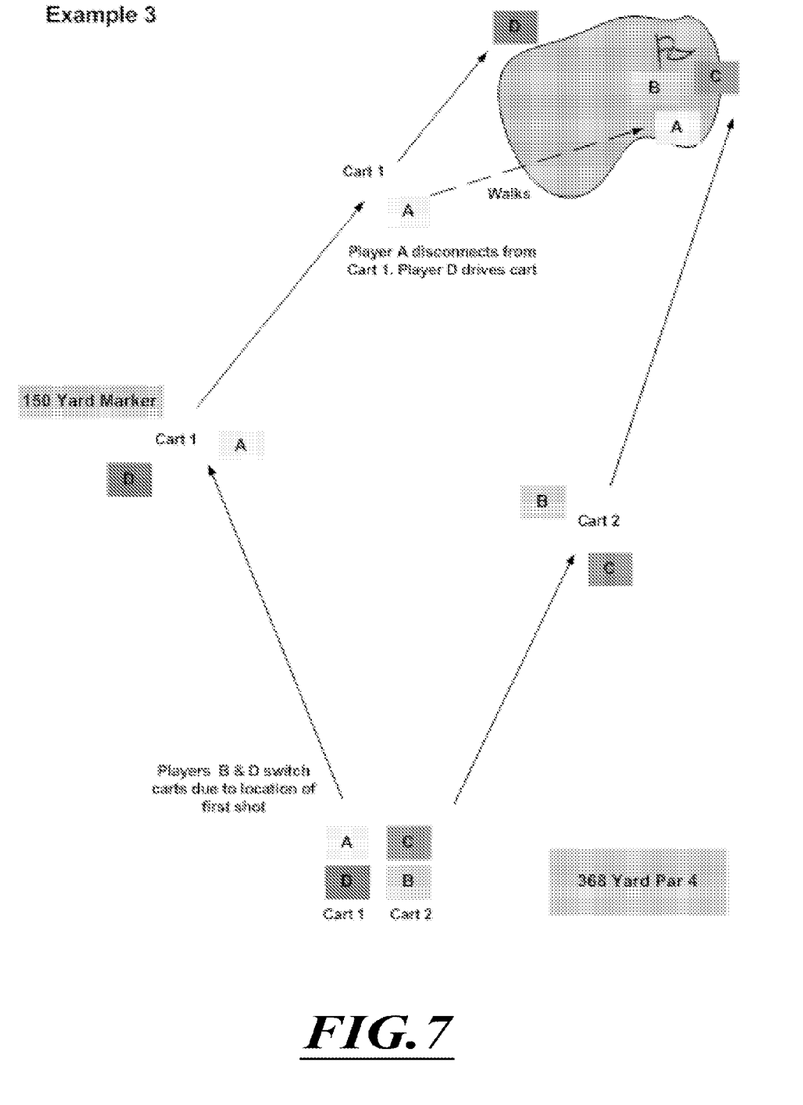
Figure 8:
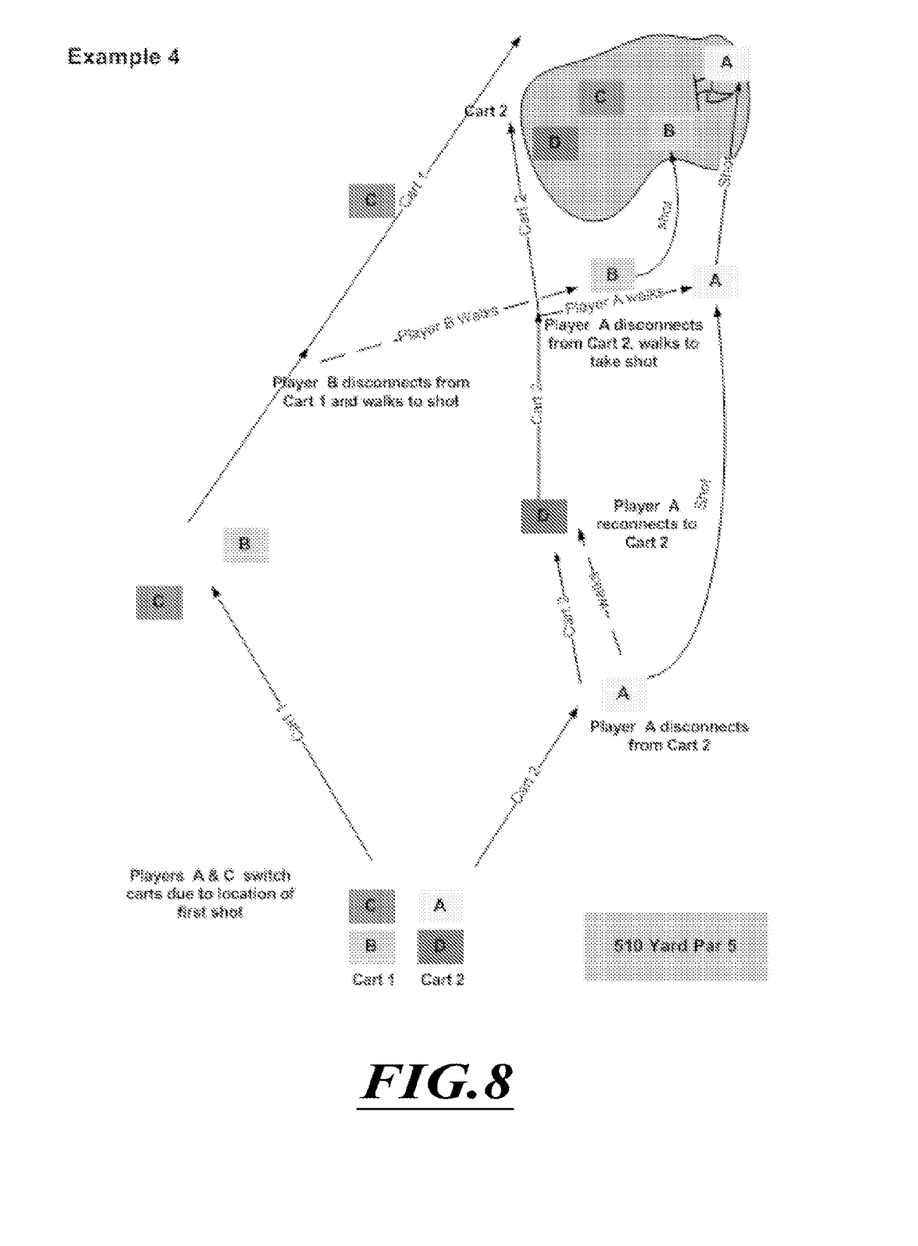

Each of Cart 1 and Cart 2 is outfitted with a universal pull cart attachment device on both the left and right side. Each golfer's clubs are retained in a respective pull cart that is initially attached to each universal pull cart attachment device. In any given hole, each of golfer A, B, C, and D will take a tee shot and then one of three scenarios will happen: (1) each golfer will stay with his respective cart and they will proceed to their respective shot location without disengaging the pull carts from the attachment device, as illustrated in FIG. 5; (2) each golfer will stay with his respective cart and proceed to one shot location and then one golfer will disconnect his pull cart while the other golfer, using the motorized cart, moves on to his shot location, as illustrated in FIG. 6; or (3) one golfer in Cart 1 and one golfer in Cart 2 will switch carts before leaving the tee box and each pair of golfers will proceed in their motorized cart to their ball location, as illustrated in FIG. 7. Subsequent shots feature the same scenarios above in various combinations. For example, FIG. 8 illustrates one possible outcome of a par five hole using the method of play described herein.

The method of play allows each golfer the freedom to continue moving forward towards the green at all times while eliminating the need to traverse laterally or across the course, or to return to one's cart to retrieve a club. Unnecessary travel is eliminated resulting in faster game play and increased revenues. FIGS. 10 and 11 illustrate potential revenue gains associated with the system of playing golf illustrated in FIGS. 5-8. It has been calculated that using a universal pull cart attachment in accordance with the method of playing golf described above will substantially reduce playing time. For example, playing time for a foursome on a eighteen hole course may be reduced by ninety minutes or more. Such a reduction in play time can equate to an increase in the number of golfers that can play during a given day in upwards of 10 foursome a day. As shown in FIG. 10, based on a $40 greens-fee, an additional 10 foursomes a day can generate $160,000 in revenue over the span of 100 days. As can be appreciated, the universal attachment device not only generates increased revenue for golf course associations and owners, but enhances a player's golf experience by eliminating unnecessary travel.

Moreover, aspects and features of the various embodiments described above can be combined to provide further embodiments. In addition, U.S. patent application Ser. No. 12/430,781, filed Apr. 27, 2009, and U.S. Provisional Application No. 61/125,799, filed Apr. 28, 2008, are incorporated herein by reference for all purposes and aspects of the invention can be modified, if necessary, to employ features, systems, and concepts disclosed in these applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A universal pull cart attachment device comprising:
a base having a cylindrical mounting stem, the cylindrical mounting stem defining a first axis of rotation;
a first retention member having a cylindrical sleeve and a hook, the sleeve aligned substantially coaxially with the first axis of rotation for rotational movement of the first retention member thereabout; and
a second retention member slidably coupled to the first retention member for translational displacement in a direction along the first axis of rotation between an engaged position and a disengaged position and configured such that when the second retention member is in the engaged position the second retention member cooperates with the hook of the first retention member to enable the attachment device to retain a handle of a pull cart.

2. The universal pull cart attachment device of claim 1 wherein the base comprises a base member and an extension member, the extension member slidably coupled to the base member for selective extension therefrom.

3. The universal pull cart attachment device of claim 2 wherein the base member is square tube and the extension member is u channel.

4. The universal pull cart attachment device of claim 1, further comprising:
a spring, the spring coupled between the first retention member and the second retention member such that the second retention member is biased towards the engaged position.

5. The universal pull cart attachment device of claim 1, further comprising:
an insert, the insert connected to the second retention member and sized for insertion in the first retention member.

6. The universal pull cart attachment device of claim 5 wherein the insert has a groove that is configured to engage a feature on the first retention member to substantially prevent relative rotational movement between the insert and the first retention member.

7. The universal pull cart attachment device of claim 1 wherein the mounting stem of the base cooperates with the sleeve of the first retention member to limit rotational travel of the first retention member about the first axis of rotation.

8. The universal pull cart attachment device of claim 7 wherein the mounting stem has a pair of grooves sized and shaped to receive a dowel extending across a cavity of the cylindrical sleeve of the first retention member, the pair of grooves having ends that limit the rotational travel of the first retention member.

9. The universal pull cart attachment device of claim 1 wherein the second retention member has a support surface, the support surface having contoured edges such that chaffing is reduced when the handle of the pull cart is retained in the device.

10. The universal pull cart attachment device of claim 1 wherein the second retention member has an extended feature protruding substantially perpendicular to the first axis of rotation such that a user may press on the extended feature to displace the second retention member from the engaged position to the disengaged position.

\* \* \* \* \*